United States Patent
Custer et al.

(10) Patent No.: US 9,937,923 B2
(45) Date of Patent: Apr. 10, 2018

(54) SYSTEM AND METHOD FOR PROVIDING A SPEED WARNING AND SPEED CONTROL

(71) Applicant: Bendix Commercial Vehicle Systems LLC, Elyria, OH (US)

(72) Inventors: Robert J Custer, Westlake, OH (US); Andrew J Pilkington, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/011,529

(22) Filed: Jan. 30, 2016

(65) Prior Publication Data
US 2017/0217435 A1      Aug. 3, 2017

(51) Int. Cl.
*B60W 30/14*      (2006.01)
*G06K 9/00*       (2006.01)

(52) U.S. Cl.
CPC ....... *B60W 30/146* (2013.01); *G06K 9/00818* (2013.01); *B60W 2420/42* (2013.01); *B60W 2550/22* (2013.01)

(58) Field of Classification Search
CPC .......... B60W 30/146; B60W 2420/42; B60W 2550/22; G06K 9/00818
See application file for complete search history.

(56) References Cited

U.S. PATENT DOCUMENTS

| 3,686,628 | A | 8/1972 | Keller et al. | |
|---|---|---|---|---|
| 6,388,578 | B1 | 5/2002 | Fagan et al. | |
| 6,801,638 | B1 * | 10/2004 | Janssen | B60K 35/00 340/910 |
| 7,468,680 | B2 | 12/2008 | Heffernan | |
| 7,907,063 | B2 | 3/2011 | Simon | |
| 8,041,493 | B2 * | 10/2011 | Seto | B60K 31/00 340/441 |

(Continued)

FOREIGN PATENT DOCUMENTS

| CA | 2768484 A1 * | 8/2012 | .......... B60W 30/146 |
|---|---|---|---|
| DE | 102008057675 A1 | 7/2009 | |

(Continued)

OTHER PUBLICATIONS

International Search Report for counterpart International Application No. PCT/US2017/015553, 3 pages, dated May 24, 2017.

(Continued)

*Primary Examiner* — Tuan C. To
(74) *Attorney, Agent, or Firm* — Brian E. Kondas; Cheryl L. Greenly; Eugene E. Clair (57) ABSTRACT

A controller is adapted to receive signals indicative of an image including a representation of a posted speed limit for a current section of a road on which an associated vehicle is traveling. The controller evaluates the image to identify the posted speed limit and dynamically determines if the posted speed limit is above a predetermined threshold speed limit. Only if the posted speed limit is above the predetermined threshold speed limit, the controller sets the identified posted speed limit as a warning threshold. If a speed of the associated vehicle is more than a predetermined range over the warning threshold, the controller transmits a warning signal to a notifier for notifying an operator of the associated vehicle and controls a speed of the vehicle based on the posted speed limit.

27 Claims, 4 Drawing Sheets

(56) References Cited

U.S. PATENT DOCUMENTS

| | | |
|---|---|---|
| 8,055,427 B2 | 11/2011 | Shin |
| 8,125,326 B2 | 2/2012 | Romp |
| 8,494,759 B2 | 7/2013 | Hada |
| 8,626,418 B2 | 1/2014 | Boulet et al. |
| 8,983,750 B2 * | 3/2015 | Maruyama .......... B60W 50/085 701/93 |
| 9,218,535 B2 * | 12/2015 | Wey .................... G08G 1/09623 |
| 9,311,543 B2 * | 4/2016 | Cho .................... G06K 9/00818 |
| 2002/0147910 A1 * | 10/2002 | Brundage ........... G06F 21/6209 713/176 |
| 2005/0232469 A1 * | 10/2005 | Schofield ........... G06K 9/00818 382/104 |
| 2007/0273559 A1 | 11/2007 | Furuya et al. |
| 2008/0243350 A1 | 10/2008 | Harkness |
| 2009/0146844 A1 | 6/2009 | Hassan |
| 2009/0169055 A1 * | 7/2009 | Ishikawa ................ G01C 21/32 382/104 |
| 2009/0172527 A1 * | 7/2009 | Buecker ........... G08G 1/096716 715/700 |
| 2009/0243883 A1 * | 10/2009 | Simon .............. G08G 1/096716 340/905 |
| 2010/0063687 A1 * | 3/2010 | Hu ........................ B60W 10/06 701/46 |
| 2010/0121526 A1 | 5/2010 | Pham |
| 2010/0217494 A1 * | 8/2010 | Heft ........................... B60T 7/22 701/70 |
| 2010/0302361 A1 * | 12/2010 | Yoneyama ......... G06K 9/00818 348/135 |
| 2011/0288770 A1 * | 11/2011 | Greasby ............. G01C 21/3697 701/532 |
| 2012/0005180 A1 * | 1/2012 | Chen .................... G01C 21/367 707/705 |
| 2012/0162429 A1 * | 6/2012 | Wuerz-Wessel ..... G06K 9/6228 348/148 |
| 2013/0113633 A1 * | 5/2013 | Pilutti .............. G08G 1/096716 340/905 |
| 2013/0158795 A1 * | 6/2013 | Hahne .................... G06F 17/00 701/36 |
| 2013/0222175 A1 | 8/2013 | Smith et al. |
| 2013/0271292 A1 * | 10/2013 | McDermott ...... G08G 1/096783 340/905 |
| 2014/0119605 A1 | 5/2014 | Zobel |
| 2014/0300741 A1 | 10/2014 | Wey et al. |
| 2015/0278615 A1 * | 10/2015 | Ogawa ............... G06K 9/00818 348/148 |
| 2015/0312327 A1 * | 10/2015 | Fowe .................... G01C 21/26 701/23 |
| 2016/0082971 A1 * | 3/2016 | Fuehrer ................. B60W 10/20 701/48 |
| 2016/0114812 A1 * | 4/2016 | Maruyama .......... B60W 50/082 701/23 |
| 2016/0356880 A1 * | 12/2016 | Negussu ................. G01S 7/022 |
| 2017/0010117 A1 * | 1/2017 | Oh ...................... G01C 21/3492 |
| 2017/0076509 A1 * | 3/2017 | Scofield ............... G08G 1/0112 |
| 2017/0140647 A1 * | 5/2017 | Schumann ........... G08G 1/0967 |

FOREIGN PATENT DOCUMENTS

| | | | | |
|---|---|---|---|---|
| JP | DE 102012201454 A1 * | 8/2012 | ......... | G06K 9/00818 |
| KR | 20120057351 A * | 6/2012 | | |

OTHER PUBLICATIONS

Information on Search Strategy for counterpart International Application No. PCT/US2017/015553, 1 page, dated May 24, 2017.
Written Opinion of the International Searching Authority for counterpart International Application No. PCT/US2017/015553, 9 pages, dated May 24, 2017.

* cited by examiner

SYSTEM AND METHOD FOR PROVIDING A SPEED WARNING AND SPEED CONTROL

BACKGROUND

The present invention relates to vehicle speed warning and regulation systems. It finds particular application in conjunction with selectively using sign recognition for warning a vehicle operator about a vehicle's speed and controlling a vehicle speed and will be described with particular reference thereto. It will be appreciated, however, that the invention is also amenable to other applications.

Speed limits and driving conditions along any given route may change frequently, particularly in urban settings. In addition, along a given route speed limits may change according to the time of day, such as during school hours or rush hours. The current and accepted method of informing the driver of the speed limit is through posted speed limit signs on the side of the road. However, when multiple speed limit signs are posted for a single section of road (e.g., both a school time speed limit and a non-school time speed limit in a school zone), a driver must determine which speed is applicable.

Warning systems have been developed for notifying an operator of a vehicle when the speed of the vehicle is undesirable. Cruise control systems have been developed for regulating the speed of a vehicle. Some of these systems incorporate cameras for imaging passing speed limit signs, which post the current speed limit, as the vehicle travels. A processing unit associated with the warning and/or cruise control systems evaluate(s) images of the speed limit signs for identifying the posted speed limit. The processor then warns the operator and/or regulates the speed of the vehicle to achieve the posted speed limit.

As noted above, a single section of road in, for example, a school zone may include multiple speed limit signs or a single speed limit sign with different posted speed limits that are in effect at different times. Since exceeding a posted speed limit can have negative consequences such as personal injury, property damage, and fines from speeding tickets, current warning and cruise control systems elect the lower speed limit regardless of whether that lower limit is currently in effect.

A lower speed limit (e.g., 20 mph) in a school zone may only be in effect a few hours each school day. For non-urban highways, the non-school time posted speed limit may be significantly higher (e.g., 50 mph). Therefore, a camera based warning and/or cruise control system that determine(s) the current posted speed limit by evaluating images of speed limit signs may unnecessarily warn and/or slow a vehicle in the school zone during times when the school speed limit is not in effect.

The present invention provides a new and improved apparatus and method for warning and cruise control systems.

SUMMARY

In one aspect of the present invention, it is contemplated that a controller is adapted to receive signals indicative of an image including a representation of a posted speed limit for a current section of a road on which an associated vehicle is traveling. The controller evaluates the image to identify the posted speed limit and dynamically determines if the posted speed limit is above a predetermined threshold speed limit. Only if the posted speed limit is above the predetermined threshold speed limit, the controller sets the identified posted speed limit as a warning threshold. If a speed of the associated vehicle is more than a predetermined range over the warning threshold, the controller transmits a warning signal to a notifier for notifying an operator of the associated vehicle and controls a speed of the vehicle based on the posted speed limit.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
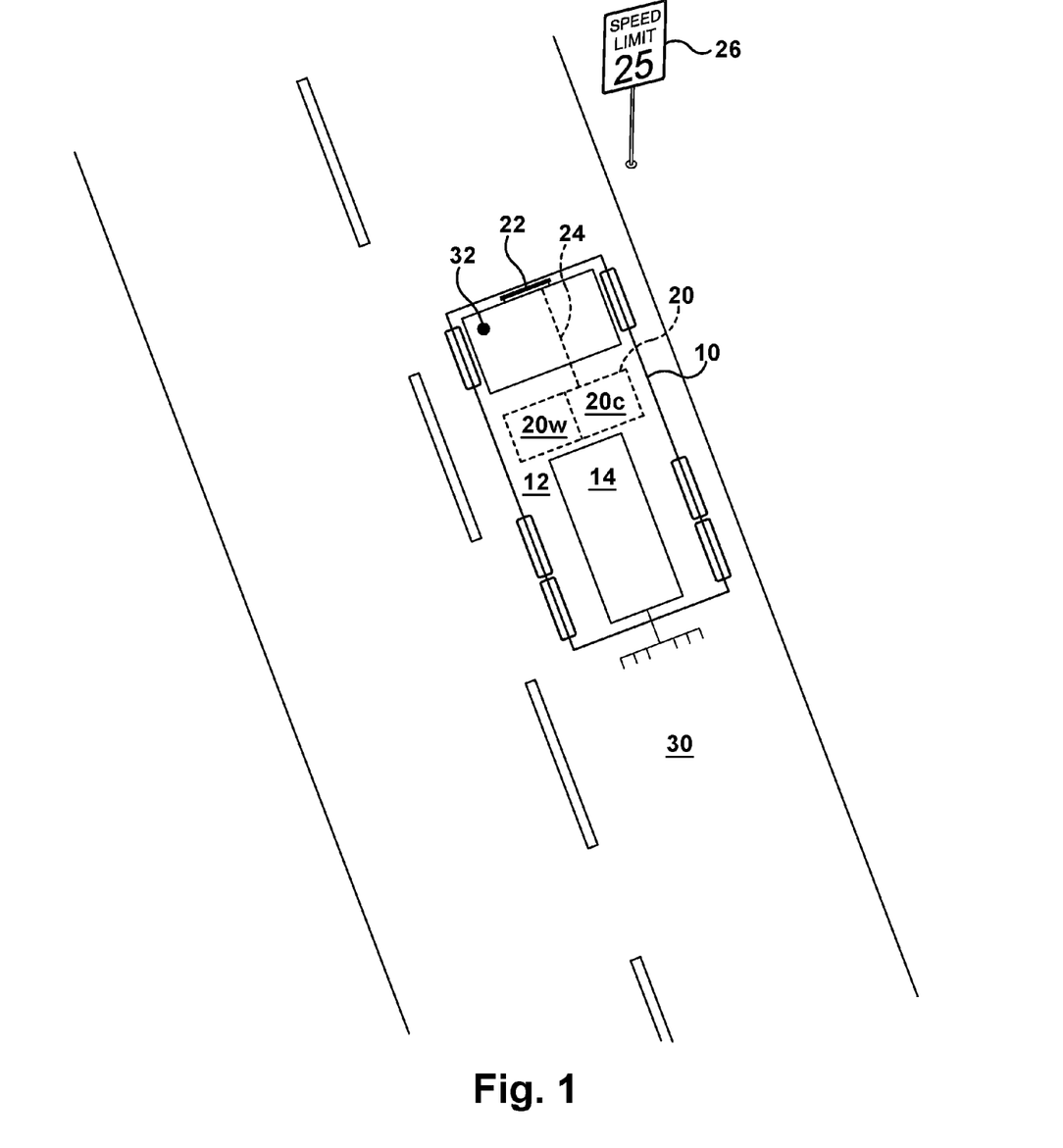
FIG. 1 illustrates a schematic representation of a vehicle on a road in accordance with one embodiment of an apparatus illustrating principles of the present invention.

With reference to FIG. 1, a simplified component diagram of an exemplary vehicle 10 including a system 12 for warning an operator of the vehicle 10 regarding a speed of the vehicle 10 and a system 14 for controlling a speed of the vehicle 10 is illustrated in accordance with one embodiment of the present invention. Although the warning and control systems 12, 14, respectively, are described as separate and independent systems, it is contemplated that the warning and control systems 12, 14, respectively, may also be combined into a single vehicle system.

The warning system 12 includes a first controller $20_W$ (e.g., the warning controller), and the control system 14 includes a second controller $20_C$ (e.g., a speed control controller). If the warning and control systems 12, 14, respectively, are combined into a single vehicle system, only a single controller 20 is contemplated for both the warning and speed control functions. Therefore, for purposes of discussion, only a single controller 20, which incorporates the features and functions of the warning controller and the speed control controller, is discussed.

The vehicle also includes at least one camera 22 that is part of the warning and control systems 12, 14, respectively. The at least one camera 22 electrically communicates with the controller 20 via, for example, a vehicle communication bus 24. Therefore, the controller 20 is adapted to receive signals indicative of an image from the at least one camera 22 via the vehicle communication bus 24.

Figure 2:
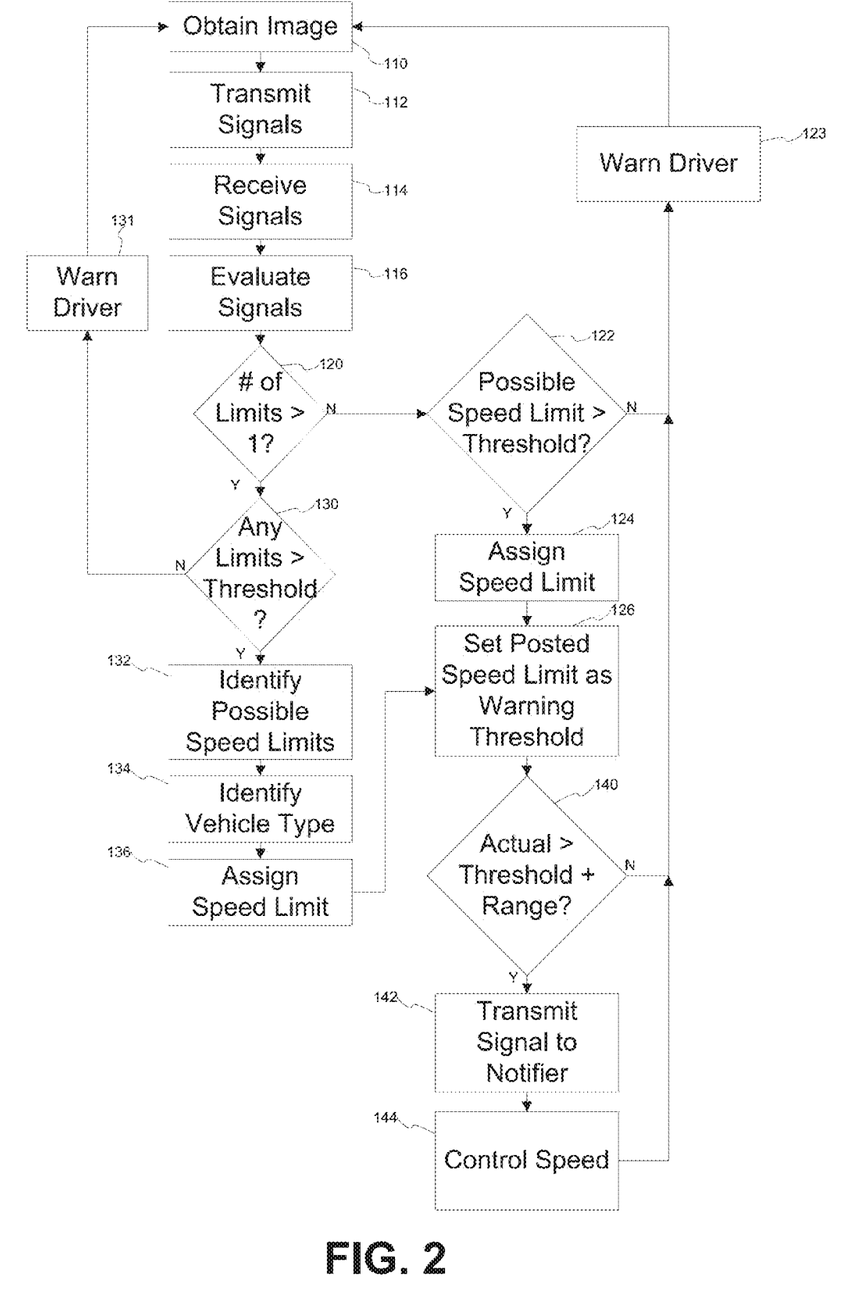
FIG. 2 is an exemplary methodology of providing a speed warning and speed control in accordance with one embodiment illustrating principles of the present invention.

With reference to FIG. 2, an exemplary methodology of the system shown in FIG. 1 for warning an operator of the vehicle 10 based on a speed of the vehicle 10 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

Figure 3:
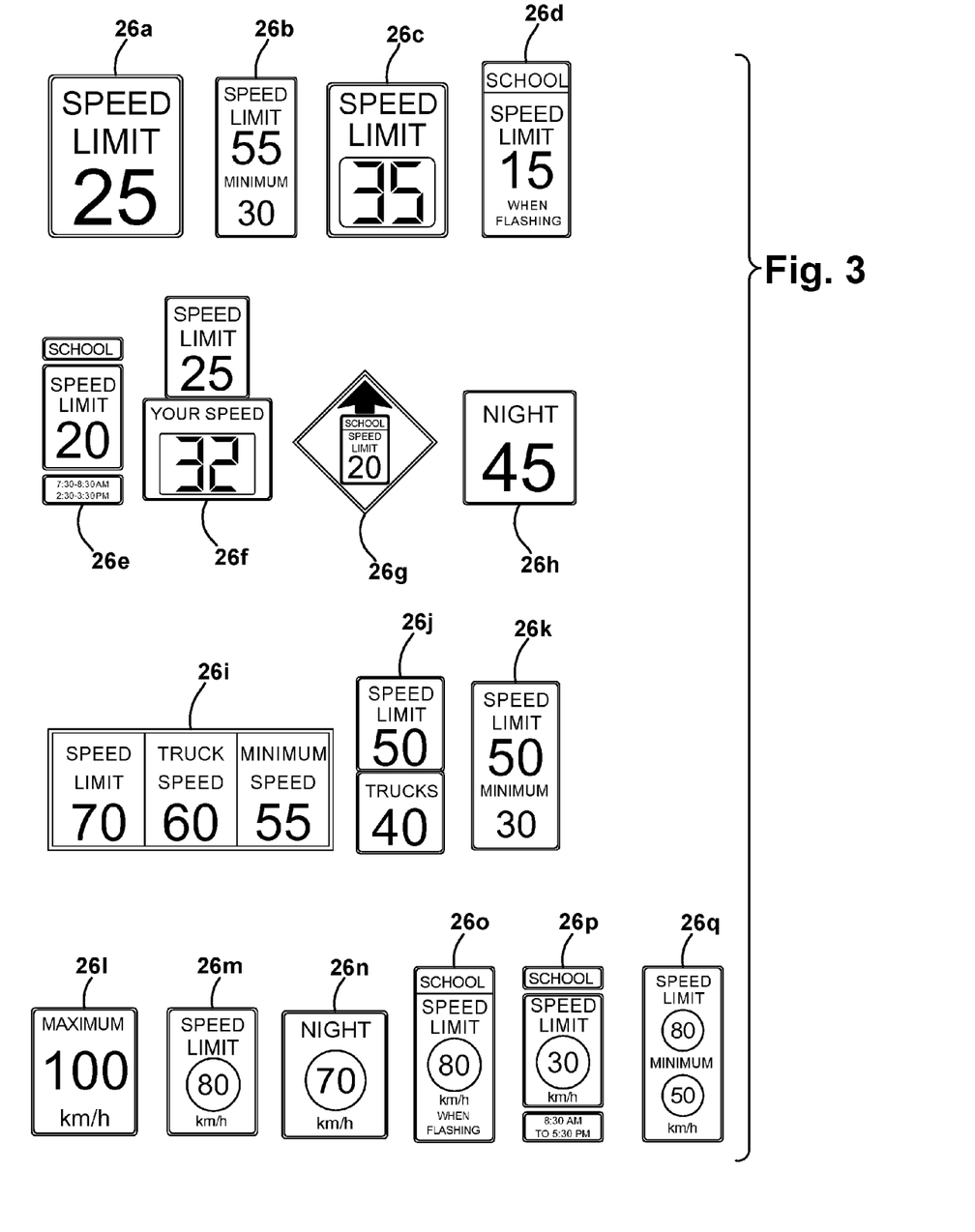
FIG. 3 illustrates various signs in accordance with different embodiments of the present invention.

With reference to FIGS. 1 and 2, the camera 22 obtains an image, in a step 110, of a sign 26 on, for example, a side of a road 30 on which the vehicle 10 is traveling. The camera 22 transmits signals indicative of the image of the sign 26, in a step 112, to the controller 20. FIG. 3 illustrates various embodiments of the sign that may be imaged in the step 110 and transmitted to the controller 20 in the step 112. The signs 26a-26k are signs found in the United States, and the signs 26l-26q are signs found in the Canada. The sign 26a is a standard speed limit sign; the sign 26b is a speed limit sign showing both the (maximum) speed limit and a minimum speed limit; the sign 26c is an electronic speed limit sign showing the speed limit; the sign 26d is a school speed limit sign including the word "SCHOOL" and an extension banner 28; the sign 26e is a school speed limit sign including the word "SCHOOL" and active school times; the sign 26f is a standard speed limit sign along with an electronic sign showing the actual speed of an approaching vehicle; the sign 26g is a sign indicating an approaching speed limit zone; the sign 26h is a sign indicating a night speed limit; the sign 26i is a sign indicating different speed limits for passenger cars (e.g., a default speed limit of 70 mph), a different speed limit for trucks (e.g., 60 mph), and a minimum speed limit of 55 mph; the sign 26j is a sign indicating speed limits for both passenger cars and trucks; and the sign 26k is a sign indicating both a (maximum) speed limit and a minimum speed limit. The sign 26l is a standard speed limit sign; the sign 26m is also a standard speed limit sign; the sign 26n is sign indicating a night speed limit; the sign 26o is a school speed limit sign including the word "SCHOOL"; the sign 26p is a school speed limit sign including the word "SCHOOL" and active school times; and the sign 26q is a sign indicating both a (maximum) speed limit and a minimum speed limit.

With reference to FIGS. 1-3, the signals indicative of the image of the sign 26 are received in the controller 20 in a step 114. In one embodiment, the sign 26 includes a representation of at least one posted speed limit for a current section of the road 30 on which the vehicle 10 is traveling. The controller 20 evaluates the signals indicative of the image of the sign 26 (e.g., the sign 26a) in a step 116, to identify the at least one posted speed limit (e.g., 25 mph) as respective possible speed limits for the current section of the road 30 on which the vehicle 10 is traveling.

For example, if two (2) or more speed limits are posted on the sign 26 (see, for example, the sign 26i in FIG. 3) and if more than one of the posted speed limits are above a predetermined threshold speed limit (e.g., 23 mph), it is assumed a first of the posted speed limits is for a certain type of vehicle and a second of the posted speed limits is for a second type of vehicle. In the illustrated embodiment, the first type of vehicle is a passenger car, and the second type of vehicle is for trucks (e.g., vehicles having a gross vehicle weight rating greater than 26,000 lbs. (2 tons)). If one of the posted speed limits is not above the predetermined threshold, it is assumed that the lower (e.g., lowest) of the speed limits is the speed limit when a school zone is active and the higher (e.g., highest) of the speed limits is the speed limit when the school zone is not active. Therefore, in a step 120, the controller 20 determines how many possible speed limits are on the sign 26. If it is determined in the step 120 that only one (1) possible speed limit is on the sign 26, control passes to a step 122 for determining if the possible speed limit is above the predetermined threshold speed limit (e.g., 23 mph) and/or if the sign itself indicates a school zone. If it is determined in the step 122 that the possible speed limit is not above the predetermined threshold speed limit, if the sign includes the word "SCHOOL" (see, for example, the sign 26d in FIG. 3), or if the sign is an elongated sign with an extension banner (see, for example, the sign 26d in FIG. 3), any of which would indicate a school zone having a speed limit of, for example 20 mph or less, control passes to a step 123 for optionally warning the operator of the vehicle 10 of the possible reduced speed before returning to the step 110 for obtaining a next image of a sign. Otherwise, if it is determined in the step 122 that the possible speed limit is above the predetermined threshold speed limit and that the sign itself does not indicate a school zone, control passes to a step 124 for assigning the possible speed limit on the sign 26 as the posted (e.g., identified) speed limit (e.g., the actual speed limit). Control then passes to a step 126.

If it is determined in the step 120 that more than one (1) possible speed limit is on the sign 26, control passes to a step 130 for determining if none of the possible speed limits on the sign 26 is above the predetermined threshold speed limit (e.g., 23 mph), which would indicate a school zone having a speed limit of, for example 20 mph. If it is determined in the step 130 that none of the possible speed limits is above the predetermined threshold limit, control passes to a step 131 for optionally warning the operator of the vehicle 10 of the possible reduced speed before returning to the step 110. If, on the other hand, it is determined in the step 130 that any of the possible speed limits on the sign 26 is above the predetermined threshold speed limit, control passes to a step 132 for identifying the possible speed limits on the sign 26 that are above the predetermined threshold speed limit (e.g., 23 mph). In one example, the sign 26i includes three (3) speed limits (e.g., a default speed limit of 70 mph, a speed limit of 65 mph for trucks (over 13 tons), and a minimum speed limit of 45 mph). For purposes of discussion, it is assumed the controller 20 recognizes a minimum speed limit (e.g., by recognizing the word "minimum" or the abbreviation "min") and disregards that possible speed limit. In this example, the controller 20 recognizes both 70 mph and 65 mph as possible speed limits.

In a step 134, the type of the vehicle 10, which it is assumed was previously programmed into the controller 20, is identified. For example, the vehicle 10 may be of a passenger care type or a heavy vehicle type (e.g., a truck at least 26,000 lbs. or 13 tons). In a step 136, if the vehicle type is a passenger car, the controller 20 assigns the higher (e.g., highest) of the possible speed limits as the posted (e.g., identified) speed limit; otherwise if the vehicle type is a heavy vehicle (e.g., truck), the controller 20 assigns the lower (e.g., lowest) of the possible speed limits as the posted (e.g., identified) speed limit (e.g., the actual speed limit). Control then passes to the step 126.

In the step 126, the posted (e.g., identified) speed limit is set as a warning threshold. Since any possible speed limits not above the predetermined threshold speed limit (e.g., 23 mph) were ignored, only speed limits above the predetermined threshold speed limit (e.g., 23 mph) may be set as the warning threshold. A determination is made, in a step 140, if an actual speed of the vehicle 10 is more than a predetermined range (e.g., 5 mph) over the warning threshold. If it is determined in the step 140 that the actual speed of the vehicle 10 is not more than the predetermined range over the warning threshold, control returns to the step 110 for obtaining a next image of a sign. Otherwise, if it is determined in the step 140 that the actual speed of the vehicle 10 is more than the predetermined range over the warning threshold, control passes to a step 142.

Figure 4:
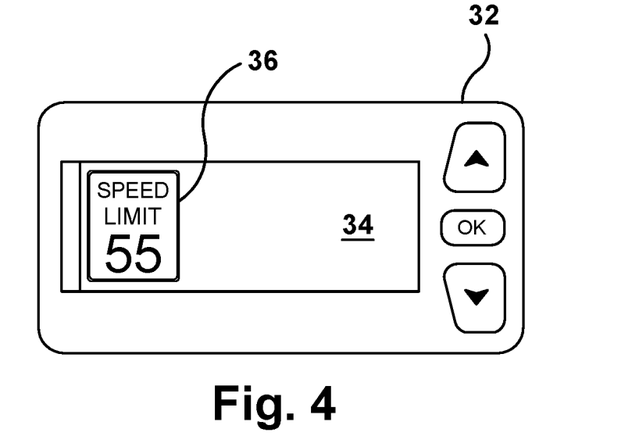
FIG. 4 illustrates a representation of a display in accordance with one embodiment of an apparatus illustrating principles of the present invention.
Figure 5:
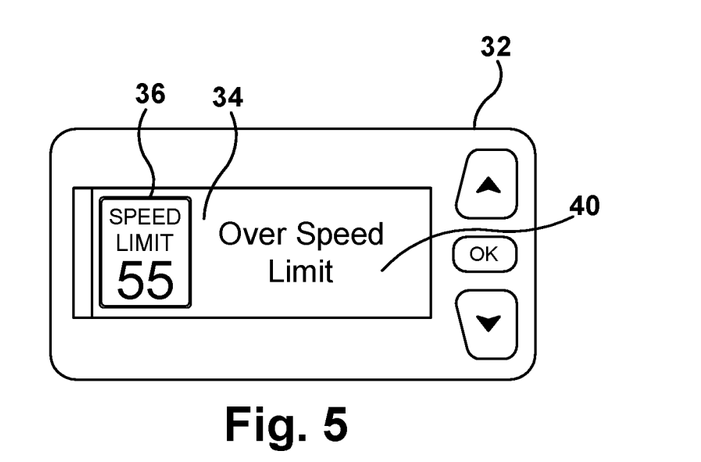
FIG. 5 illustrates another representation of a display in accordance with one embodiment of an apparatus illustrating principles of the present invention.

In the step 142, the controller 20 transmits a signal to a notifier 32 for activating the notifier 32 to ensure the operator of the vehicle 10 is aware that the vehicle 10 is traveling more than the predetermined range over the posted speed limit. With reference to FIG. 4, in one embodiment, the notifier 32 includes a display screen 34 displaying a speed limit sign 36 showing the identified (e.g., actual) speed limit. With reference to FIG. 5, in one embodiment, the notifier 32 also displays a warning message 40 stating, for example, "Over Speed Limit" if the actual speed of the vehicle is over the posted speed limit by more than the predetermined range, for example. In another embodiment, the notifier 32 is a light on a dashboard of the vehicle 10 that is illuminated when the vehicle 10 is traveling more than the predetermined range over the posted speed limit. In yet another embodiment, the notifier 32 is a device making an audible sound when the vehicle 10 is traveling more than the predetermined range over the posted speed limit. Still further, it is contemplated that the notifier 32 is a device making a steering wheel of the vehicle 10 vibrate if the vehicle 10 is traveling more than the predetermined range over the posted speed limit. In a step 144, the controller 20 transmits at least one signal to speed control components on the vehicle 10 for controlling a speed of the vehicle 10 to be within the predetermined range over the warning threshold. Control then returns to the step 110 for obtaining a next image of a sign.

The effect of the system and method described above is to not warn the operator of the vehicle 10 or control the speed of the vehicle 10 to limit the speed of the vehicle 10 if the posted speed limit is not more than the predetermined threshold limit. So, for example, if the vehicle 10 is in a school zone, the operator is not warned of the lower speed limit (e.g., ≤20 mph). Since the time periods during which school zone speed limits are active, it is assumed the vehicle operator will reduce the speed of the vehicle when necessary.

In one embodiment, it is contemplated that the controller 20 acts as a means for evaluating the image to identify if the sign indicates a school zone speed limit.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller adapted to:
   receive signals indicative of an image of a sign including a representation of at least one posted speed limit for a current section of a road on which an associated vehicle is traveling;
   evaluate the image to identify any of the at least one posted speed limits;
   select any of the at least one posted speed limits greater than or equal to a predetermined threshold speed limit as a possible speed limit for the associated vehicle;
   determine an identified speed limit for the associated vehicle based on all of the possible speed limits;
   transmit a signal for controlling a speed of the associated vehicle based on the identified speed limit; and
   transmit a signal for displaying the identified speed limit on a display.

2. The controller as set forth in claim 1, wherein the controller is further adapted to:
   set the predetermined threshold speed limit as 23 mph.

3. The controller as set forth in claim 1, wherein the controller is further adapted to:
   control the speed of the associated vehicle to be within a predetermined range of the identified speed limit.

4. The controller as set forth in claim 1, wherein the controller is further adapted to:
   determine the identified speed limit as one of the highest possible speed limit and the lowest possible speed limit.

5. The controller as set forth in claim 1, wherein the controller is further adapted to:
   identify the associated vehicle as one of a plurality of vehicle types.

6. The controller as set forth in claim 5, wherein the controller is further adapted to:
   determine the identified speed limit based on all of the possible speed limits and the vehicle type of the associated vehicle.

7. The controller as set forth in claim 6, wherein the controller is further adapted to:
   identify the vehicle type of the associated vehicle as a heavy vehicle having a gross vehicle weight rating greater than 26,000 lbs.; and
   determine the identified speed limit as the lowest of the possible speed limits.

8. A controller adapted to:
   receive signals indicative of an image including a representation of a posted speed limit on a sign for a current section of a road on which an associated vehicle is traveling;
   evaluate the image to identify the posted speed limit;
   dynamically determine if the posted speed limit is above a predetermined threshold speed limit;
   only if the posted speed limit is above the predetermined threshold speed limit, set the identified posted speed limit as a warning threshold;
   if a speed of the associated vehicle is more than a predetermined range over the warning threshold, transmit a warning signal to a notifier for notifying an operator of the associated vehicle; and
   transmit the warning signal to the notifier for causing the posted speed limit and a warning message to be displayed on the notifier.

9. The controller as set forth in claim 8, wherein the controller is further adapted to:
   only if the posted speed limit is above the predetermined threshold speed limit, control a speed of the associated vehicle based on the set posted speed limit.

10. The controller as set forth in claim 8, wherein the controller is further adapted to:
    set the predetermined threshold speed limit as 23 mph.

11. The controller as set forth in claim 8, wherein the controller is further adapted to:
    set the predetermined range as 5 mph.

12. A controller adapted to:
receive signals indicative of an image of a sign including a representation of a possible speed limit for a current section of a road on which an associated vehicle is traveling;
evaluate the image to identify if the sign indicates a school zone speed limit;
only if the evaluation of the image indicates the sign is not a school zone speed limit, set a warning threshold speed limit to the possible speed limit; and
if a speed of the associated vehicle is more than a predetermined range over the warning threshold speed limit, transmit a warning signal to a notifier for notifying an operator of the associated vehicle by causing the warning threshold speed limit and a warning message to be displayed on the notifier.

13. The controller as set forth in claim 12, wherein the controller is further adapted to:
evaluate the image to identify the sign indicates a school zone speed limit if the sign includes the word "SCHOOL".

14. The controller as set forth in claim 12, wherein the controller is further adapted to:
evaluate the image to identify the sign indicates a school zone speed limit if the sign includes an extension banner.

15. The controller as set forth in claim 12, wherein the controller is further adapted to:
only if the evaluation of the image indicates the sign is not a school zone speed limit, control a speed of the associated vehicle based on the warning threshold speed limit.

16. The controller as set forth in claim 12, wherein the controller is further adapted to:
transmit the warning signal to the notifier for causing the an audible message to be conveyed from the notifier.

17. A method for setting a warning threshold speed limit, the method comprising:
receiving signals indicative of an image of a sign including a representation of a possible speed limit for a current section of a road on which an associated vehicle is traveling;
evaluating the image to identify if the sign indicates a school zone speed limit;
only if the evaluation of the image indicates the sign is not a school zone speed limit, setting a warning threshold speed limit to the possible speed limit;
if a speed of the associated vehicle is more than a predetermined range over the warning threshold speed limit, transmitting a warning signal to a notifier for notifying an operator of the associated vehicle by causing the posted speed limit and a warning message to be displayed on the notifier; and
only if the posted speed limit is above the predetermined threshold speed limit, controlling a speed of the associated vehicle based on the set posted speed limit.

18. The method for setting a warning threshold speed limit as set forth in claim 17, further including:
evaluating the image to identify the sign indicates a school zone speed limit if the sign includes the word "SCHOOL".

19. The method for setting a warning threshold speed limit as set forth in claim 17, further including:
evaluating the image to identify the sign indicates a school zone speed limit if the sign includes an extension banner.

20. The method for setting a warning threshold speed limit as set forth in claim 17, further including:
if a speed of the associated vehicle is more than the predetermined range over the warning threshold speed limit, transmitting the warning signal to the notifier for causing the warning threshold speed limit and a warning message to be displayed on the notifier.

21. A method for identifying and controlling a speed, the method comprising:
receiving signals indicative of an image of a sign including a representation of at least one posted speed limit for a current section of a road on which an associated vehicle is traveling;
evaluating the image to identify any of the at least one posted speed limits;
selecting any of the at least one posted speed limits greater than or equal to a predetermined threshold speed limit as a possible speed limit for the associated vehicle;
determining an identified speed limit for the associated vehicle based on all of the possible speed limits;
transmitting a signal for controlling a speed of the associated vehicle based on the actual speed limit;
transmitting a signal for displaying the actual speed limit on a display; and
transmitting a signal for displaying a warning message on the display if the speed of the associated vehicle is greater than the actual speed limit by a predetermined range.

22. The method for identifying and controlling a speed as set forth in claim 21, further including:
setting the predetermined threshold speed limit as 23 mph.

23. The method for identifying and controlling a speed as set forth in claim 21, further including:
controlling the speed of the associated vehicle to be within a predetermined range of the identified speed limit.

24. The method for identifying and controlling a speed as set forth in claim 21, further including:
determining the identified speed limit as one of the highest possible speed limit and the lowest possible speed limit.

25. The method for identifying and controlling a speed as set forth in claim 21, further including:
identifying the associated vehicle as one of a plurality of vehicle types.

26. The method for identifying and controlling a speed as set forth in claim 25, further including:
determining the identified speed limit based on all of the possible speed limits and the vehicle type of the associated vehicle.

27. A controller adapted to:
receive signals indicative of an image of a sign including a representation of a possible speed limit for a current section of a road on which an associated vehicle is traveling;
means for evaluating the image to identify if the sign indicates a school zone speed limit;
only if the evaluation of the image indicates the sign is not a school zone speed limit, set a warning threshold speed limit to the possible speed limit;
if a speed of the associated vehicle is more than a predetermined range over the warning threshold speed limit, transmit a warning signal to a notifier for notifying an operator of the associated vehicle by displaying the warning threshold speed limit on a display.

\* \* \* \* \*